United States Patent [19]
Ginn et al.

[11] Patent Number: 5,547,574
[45] Date of Patent: * Aug. 20, 1996

[54] APPARATUS FOR FILTERING MINERAL SLURRIES

[75] Inventors: Michael W. Ginn, Wrightsville; Gary L. Cobb, Davisboro; Lawrence E. Broxton, Sandersville; Kelly R. McNeely, Mitchell, all of Ga.

[73] Assignee: ECC International Inc., Atlanta, Ga.

[*] Notice: The term of this patent shall not extend beyond the expiration date of Pat. No. 5,213,687.

[21] Appl. No.: 256,717

[22] PCT Filed: Jan. 19, 1993

[86] PCT No.: PCT/US93/00553

§ 371 Date: Jul. 21, 1994

§ 102(e) Date: Jul. 21, 1994

[87] PCT Pub. No.: WO93/14854

PCT Pub. Date: Aug. 5, 1993

Related U.S. Application Data

[63] Continuation-in-part of Ser. No. 823,996, Jan. 22, 1992, Pat. No. 5,213,687, and a continuation-in-part of Ser. No. 824,032, Jan. 22, 1992, Pat. No. 5,223,155.

[51] Int. Cl.$^6$ .......................... B01D 29/68; B01D 29/72; B01D 33/48; B01D 33/54
[52] U.S. Cl. .......................... 210/388; 210/107; 210/108; 210/333.1; 210/393; 210/406; 210/412; 210/427; 210/510.1; 134/1
[58] Field of Search ..................... 210/108, 106, 210/107, 333.01, 333.1, 331, 393, 406, 347, 411, 412, 388, 389, 425, 427, 510.1; 134/1

[56] References Cited

U.S. PATENT DOCUMENTS

| | | |
|---|---|---|
| 2,990,958 | 7/1961 | Greene et al. . |
| 3,014,836 | 12/1961 | Proctor, Jr. . |
| 3,138,550 | 6/1964 | Woolery . |
| 3,450,257 | 6/1969 | Cundy . |
| 3,586,523 | 6/1971 | Fanselow et al. . |
| 3,627,678 | 12/1971 | Marston et al. . |
| 3,753,498 | 8/1973 | Gwilliam . |
| 3,753,499 | 8/1973 | Gwilliam . |
| 3,782,554 | 1/1974 | Gwilliam . |
| 3,974,067 | 8/1976 | Nott . |
| 4,026,762 | 5/1977 | Bauman . |
| 4,246,039 | 1/1981 | Mixon, Jr. . |
| 4,381,948 | 5/1983 | McConnell et al. . |
| 5,039,347 | 8/1991 | Hindströ. |
| 5,213,687 | 5/1993 | Ginn et al. . |
| 5,223,155 | 6/1993 | Ginn et al. . |

OTHER PUBLICATIONS

INDUSTRIAL FILTRATION by A. Wright, M.E., "The Modern Library of Chemical Engineering", vol. I, The Chemical Catalog Company, Inc., 1923, pp. 123–136.
FILTRATION by George D. Dickey, Reinhold Publishing Corporation, 1961, pp. 16–23.

*Primary Examiner*—Thomas M. Lithgow
*Attorney, Agent, or Firm*—Klauber & Jackson

[57] ABSTRACT

An apparatus is disclosed for filtering slurries of minerals or other fine particles. The apparatus includes a filter plate having an interior porous support layer and a microporous metal filtration layer overlying the support layer, the pore sizes in the filtration layer preferably being in the range of from about 0.2 to 3 microns. The side of the filtration layer non-adjacent the support layer constitutes a filter surface for the mineral.

15 Claims, 6 Drawing Sheets

APPARATUS FOR FILTERING MINERAL SLURRIES

RELATED APPLICATIONS

This application is based on International Application PCT/US93/00553, filed Jan. 19, 1993, and is a continuation-in-part of U.S. patent applications Ser. No. 07/823,996, filed Jan. 22, 1992, and Ser. No. 07/824,032, filed Jan. 22, 1992, now respectively U.S. Pat. Nos. 5,213,687 and 5,223,155.

BACKGROUND OF INVENTION

This invention relates generally to apparatus for filtering fine particles from a liquid carrier and more specifically relates to an improved apparatus for dewatering aqueous slurries of very fine particle size minerals, including industrial minerals such as kaolin clays, calcium carbonates, and the like, as well as slurries of fine particle size coal, metalliferous ores, and the like.

In the course of processing numerous minerals, a step of dewatering by filtration is commonly utilized. Such a requirement may be exemplified by considering the processing of crude industrial minerals such as kaolin clays and ground calcium carbonates, where the crude materials are commonly subjected to a series of steps intended to remove undesired impurities such as discolorants, so as to ultimately provide a refined product which is susceptible to the particular use for which it is intended. In the instance, for example, of kaolins, such beneficiation may in some instances be accomplished by dry processing techniques, as for example by air flotation. More commonly, however, especially where the impurities or contaminants to be removed are in some manner chemically combined or intimately associated with the mineral, wet processes of various types are employed. These include such well-known processes as froth flotation, reductive and oxidative bleaching, and high intensity magnetic separation. This is in addition to wet classification, which can also be regarded as a beneficiation step achieving some of the aforementioned objectives.

Thus, in a typical procedure wherein the initial starting material is a crude sedimentary kaolin clay, including from about 1–2% titania, the said crude may be subjected to a separation process to reduce the titania content to below 0.8% by weight. More generally, the titania will be reduced to the range of from about 0.2 to 0.8. Where a froth flotation process is used for such purposes, the clay may be initially blunged and conditioned by forming an aqueous alkaline dispersion of the clay (pH adjusted to about 7–10 with ammonium hydroxide). The dispersion may include as a deflocculating agent various compounds known to be useful for such purposes, such as sodium silicate. Other useful agents include a water-soluble salt of a polyacrylic acid or polymethacrylic acid preferably having an average molecular weight in the range of from about 500–10,000. Oleic acid or other collector agent is added during the conditioning process. Reference may be had to U.S. Pat. No. 3,974,067 for further details of flotation procedures which may be utilized. Further aspects of flotation treatment of the aforementioned type can be found in numerous places in the prior art, including in Cundy, U.S. Pat. No. 3,450,257, and in U.S. Pat. Nos. 2,990,958 and 3,138,550.

The purpose of the froth flotation in the foregoing sequence is to remove titania; and accordingly other techniques can be utilized in place of or to supplement flotation, including by passing the slurry in relatively dilute form and while the clay is dispersed (typically at about 30% solids) through a high intensity magnetic field, e.g. via a magnetic separator of the type disclosed in Marston, U.S. Pat. No. 3,627,678. Such device comprises a canister packed with stainless steel wool at which enveloping magnets are capable of providing a high intensity field of 12 kilogauss or higher. Froth flotation may be combined with magnetic separation to achieve additional effects, see for example Nott, U.S. Pat. No. 3,974,067.

A further commonly used method for improving the brightness and whiteness of kaolin clays involves chemical bleaching. In this connection, it is noted that one of the principal sources of discoloring contaminants in the crude clay takes the form of insoluble oxides of iron. Thus, a common bleaching technique for removing the said contaminants, involves forming the clay into an aqueous slurry, acidifying the slurry to a pH of the order of 3.0 to 4.0 and adding a slurry soluble salt of hydrosulfurous acid. The general objective of this operation is to provide the $S_2O_4^=$ ion which acts as a reductive bleaching agent. Such ion functions to reduce the ferric compounds present in the slurry to ferrous form, the latter being readily soluble and therefore removable by subsequent washing, dewatering and filtering operations.

A still further type of beneficiation treatment applicable to kaolin crudes involves high temperature calcination. It is useful here to point out that those skilled in the art of kaolin processing and products draw a relatively sharp distinction between so-called calcined kaolins and kaolins which have not been subjected to calcination and are usually referred to as "hydrous" kaolins. With respect to such terminology, it is noted that the prior art literature, including numerous of the prior art patents relating to the field of kaolin products and processing, often uses the term "hydrous" to refer to a kaolin which has not been subjected to calcination—more specifically, which has not been subjected to temperatures above about 450° C., which temperatures serve to impair the basic crystal structure of kaolin. These so-called "hydrous" clays may have been produced from crude kaolins, which have been subjected to beneficiation as, for example, to froth flotation, to magnetic separation, to mechanical delamination, grinding, or similar comminution, but not to the mentioned heating as would impair the crystal structure. In an accurate technical sense, the description of these materials as "hydrous" is, however, incorrect. More specifically, there is no molecular water actually present in the kaolinite structure. Thus, although the structure can be (and often is) arbitrarily written in the form $2\ H_2O.Al_2O_3.2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period which eliminates the hydroxyl groups, the crystalline structure of the kaolinite is destroyed. Therefore, such material, having been thus calcined, cannot correctly be referred to as a "kaolin". Accordingly, it should be appreciated that henceforth in this specification, unless otherwise indicated, when the term "kaolin" or "kaolinite" is utilized without a qualification (such as "calcined kaolin"), such term necessarily implies that the original structure of the material is intact. Thus, the unqualified term "kaolin" as used herein, can be considered to be equivalent to the technically inaccurate (but oft-occurring) prior art usage, "hydrous kaolin" or sometimes simply "hydrous clay".

Detailed discussions of calcined clays and their method of preparation may be found in numerous prior art patents.

Particular reference may be made in this connection to U.S. Pat. Nos. 3,014,836 to Proctor, Jr. 3,586,523 to Fanselow et al; and to A. D. McConnell et al, U.S. Pat. No. 4,381,948. The procedures set forth for producing a calcined clay is detailed in the said McConnell et al patent and provides a product substantially corresponding to the commercially available product ALPHATEX® of the present assignee ECC America Inc. In the said procedure, which is exemplary of modern practice in the calcined clay art, the crude kaolin clay is blunged and dispersed to form an aqueous dispersion. The blunged and dispersed aqueous slurry is subjected to a particle size classification from which there is recovered a fine fraction slurry of the clay. Following this, the clay may be dewatered by being flocculated and filtered, redispersed as a slurry and dried; or the classified slurry may be dewatered by directly drying, for example by spray drying.

As is discussed in Fanselow et al and elsewhere, the calcined clay process as same has been outlined, can be supplemented by use of additional beneficiation steps such as those previously discussed, i.e. froth flotation, high intensity magnetic separation, and the like.

It will be evident from the foregoing that whether one is considering the processing of so-called hydrous clays or of calcined clays, at various points in the processing of same, dewatering by filtration is a common and necessary step. The predominant practice in the kaolin industry calls for such filtration to be accomplished by rotary vacuum filters (RVF), although other instrumentalities are also used as will be further discussed. Dewatering of kaolin slurries by use of such apparatus is normally accomplished in an acid (3.0–3.5 pH) flocculated condition. Most commonly, the dewatering process usually follows bleaching, and entails heating to approximately 130° F. and filtering using a rotary vacuum drum filter. Typically this technique produces a 56–62% solids product cake, and is regarded as the industry standard.

Dewatering by use of plate and frame presses, is also accomplished in an acid (3.0–3.5 pH) flocculated low solids (20–30%) condition. This technique produces a 70–72% solids product cake, but is not generally considered cost effective. Automation in recent years has somewhat offset the economic disadvantage of this type of apparatus.

In a series of patents including e.g. U.S. Pat. Nos. 3,753,498, 3,753,499, and 3,782,554, assigned to ECC International Limited of St. Austell, Cornwall, England, tube presses are described, which are also useful when filtering kaolins and similar very fine particle size minerals. Dewatering is again accomplished in an acid (3.0–3.5 pH) flocculated low solids condition. The technique has the advantage of producing a 75% solids product cake, but is unfortunately maintenance and cost intensive.

One of the known exceptions to the inability of prior art filtering techniques to effectively filter slurries of dispersed very fine particle size minerals such as kaolins having particle size distribution (PSD) such that 50% or more of same by weight are of less than 0.5 μm, involves use of the so-called electrically augmented vacuum filter ("EAVF"). Reference may be had in this connection with such use in Mixon, Jr., U.S. Pat. No. 4,246,039. Use of an EAVF enables filtering of dispersed (7.0–9.0 pH) 38–40% solids feed slurries; and the said filter is also capable of producing a 75–80% solids product cake. The EAVF technology is such that flocced kaolins cannot be effectively filtered. While it would be thought because of these advantages that the said filtering technique would have come into widespread commercial use, such is decidedly not the case. This is explained by the complexity of the device (which is based upon the principle of providing an electric field which appropriately interacts with a membrane), and the attendant high costs of maintaining and operating such device. Simply stated, the devices have not proved reliable or economically feasible for widespread application.

A further technique which has found application to dewatering of clays, is simple thermal evaporation. According to this technology, 60% solids filtered product can be thermally evaporated until the slurry reaches 70% solids. This technology is of specialized interest in application, but cannot meet the variety of needs and conditions for use required in industry such as the kaolin processing industry.

A still further technique for dewatering involves the use of centrifuges. These systems can be very effective for dewatering especially with feeds in the 20–30% range, and products up to the 50% range. When these limits are reached, the slurry viscosity and mechanical speed constraints, reduce cost effectiveness and performance to unacceptably low levels.

While the foregoing discussion has been especially directed at the unique aspects of beneficiation of kaolins, it may be noted that the requirement for dewatering of a fine particle size mineral slurry arises in many other environments. In recent years for example, precipitated calcium carbonates ("PCC's") have come into increasing use in paper manufacture. Both during production of such PCC's and in the course of handling and shipping same, it is often desired to prepare a high solids aqueous slurry or to increase the solids content of a given slurry. In either event, an effective filtration method is much sought after.

For some years the concept of ceramic filtration has been known as a method for dewatering a range of materials including slurries of particulate minerals, and such filtration techniques are in commercial use at various points in the world for the dewatering and filtering of relatively coarse minerals. Certain recent developments in the field of ceramic filtration have provided ceramic filter constructions which have proved very effective in the filtration of relatively coarse-sized minerals. Reference may especially be had in this connection to international applications WO88/06480, WO88/07402, and WO88/07887. The ceramic filtering elements described in these applications are characterized by an underlying porous support layer, and an overlying porous filtration layer. The ratio of the mean pore size in the support layer to that of the filtration layer is in the range of about 2 to 50. The pore size in the support layer is of the order of 4–50 μm and that of the filtration layer is in the range of from about 0.5 to 3 μm. Particularly in the filtration layer the pores are relatively uniform—i.e., there is a very narrow distribution (within the ranges indicated), so that one may operate at a determined bubble point with assurance that negligible air will pass through the filter during filtration, which may be accomplished at a very high efficiency. Thus in the filtration layer substantially all of the pores are in the 0.5 to 3 μm range. Further details respecting composition and preparation of these ceramic filter materials are set forth in said publications, the entire contents of which are hereby incorporated by reference.

Heretofore, the use of these materials has been limited to relatively coarse particle minerals, having a size range of approximately 1 μm or (in general) much higher. In the case of minerals such as kaolins, it has heretofore proved impractical on any commercial scale to successfully effect filtration of such materials where the average particle size is substantially below about 1 μm, where substantial quantities of the particles are <½ μm, and where the slurry from which said kaolin is to be filtered contains the kaolin is a dispersed or fully dispersed state. This is indeed the reason why the great bulk of filtration practiced in the kaolin industry, requires the use of flocculation as a precedent step to filtration. Consideration of the prior art and patents and the like will amply demonstrate this point.

Aside from the fact that flocculation introduces a complex and additional step into kaolin processing, it also has the effect of adding further undesired chemical species into the slurry, i.e., the flocculation is usually accomplished by acidification, e.g. with the addition of sulfuric acid or other acid-introducing species, which further complicates the process chemistry due to the need for later neutralization. The result of the latter can be the creation of fluxing agents, unless a great degree of washing is used, which indeed is one of the further consequences of flocculation and conventional filtering. (Fluxing agents are of great concern where the kaolin being processed is intended as a calciner feed.)

In accordance with the teaching of our U.S. Pat. No. 5,098,538, an improvement was provided which is applicable to the process for beneficiating a crude kaolin wherein a wet classification step provides a classified kaolin fraction having a PSD such that at least 50% by weight thereof are of less than ½ µm ESD and substantially 100% by weight are of less than 10 µm ESD; and wherein an aqueous slurry of the classified kaolin is at least partially dewatered by filtration. According to our said improvement, at least one or more of the filtration steps are effected by flowing the aqueous kaolin slurry through a ceramic filter plate. The filter plate is characterized by a porous support layer and an overlying porous filtration layer, the ratio between the respective mean pore sizes of the filtration layer material and the material of the base layer being between about 2 and 50. The pore size in the filtration layer is in the range of from about 1 to 3 µm and the pore size in the base layer is in the range of from about 4 to 50 µm. The flow through the filter plate is from the direction of the filter layer toward the base layer, and is effected by establishing a fluid pressure differential across the filter plate, preferably by application of vacuum or partial vacuum conditions at the side of the filter plate to which the water is drawn. The kaolin subjected to the filtration may be substantially fully dispersed in the slurry being treated, and the pH of the slurry can be in the range of from about 6.0 to 8.0. The kaolin subjected to the filtration may also be in a flocculated state or in a state of partial dispersion. More generally, the pH of the slurry treated by the invention may therefore reside anywhere in the broad range of from about 2 to 10.

The method of U.S. Pat. No. 5,098,583 may be used to treat a grey kaolin where the classification step has provided a fraction having a PSD such that at least 95% by weight thereof are of less than 1 µm ESD. This fraction can also have been subjected to a high intensity magnetic separation of a dispersed slurry and the output from the magnetic separator may be passed to the ceramic filter without use of any intervening flocculation step. Similarly, an oxidative bleaching step, as for example by use of ozone, may have been used upstream of the magnetic separation of the grey kaolin. The partially dewatered slurry from the ceramic filter can be spray dried to provide a feed for subsequent calcination (oxidative bleaching would not be used when the product was intended for calcination.

More generally, the method of our prior said patent may be used to treat any coarse or fine grey kaolin. These kaolins cannot normally be beneficiated by reductive bleaching and also do not floc well. The invention, however, facilitates beneficiation of these grey kaolins in a process which can include one or more of such steps as blunging, degritting, magnetic separation, ozonation, classification and dewatering.

In the case of the flocculated kaolin, the partially dewatered kaolin slurry from the ceramic filter can be dispersed and then dewatered at a further ceramic filter to provide a high solid slurry including >70% by weight solids. This high solids slurry may be used directly in that form, or may be spray dried to provide a product. Where the kaolin in the slurry provided to the ceramic filter is at least partially dispersed, it may include about 60% solids, and the slurry can be further dewatered by the ceramic filter, to again provide a slurry having >70% solid.

The method of our prior invention offers several benefits in kaolin processing. Among these are: Kaolin particle size ranging from coarse to ultrafine (10 µm to ¼ µm) can be filtered. Kaolin processing can be effectively performed in a wide range of pH's, i.e., from 2 to 10. Economical dewatering rates and product solids using various feed solids 5–70%, solids with product solids up to 80% can be obtained using this technology. The process operates under broad temperature ranges, and filters flocced, semi-dispersed, and dispersed feeds, so that the resulting filtrate is clear with little or no suspended solids.

Both in the instances of kaolin filtration as taught in our U.S. Pat. No. 5,098,583 patent, and as well in the instance of other prior disclosed use of filters of the types discussed herein, serious impediments to practical large scale commercial use of same has been presented as a consequence of the tendency of such filters to become clogged with the fine particles of the slurry being filtered. Directly related to this is the difficulty encountered in removing the filter cakes, that having been formed upon the surface of the filter via a suction process, is found to adhere so tenaciously to such surface, that a scraper or doctor blade or other mechanical attack on the filter cake is conventionally required to effect removal of the cake. See in this connection WO 88/07887. These prior art techniques of cake removal are at best inefficient, of limited efficacy, and are inconsistent and relatively unpredictable in results. They are, furthermore, poorly adapted to an operation predicated on a continuous or semi-continuous operation; i.e. one in which the filter plate is rapidly used for filtration, and then is subjected to cake removal, after which the plate must be fully ready for further recycling in the same process.

In accordance with the foregoing, it may be regarded as an object of the present invention, to provide apparatus based upon use of microporous filter plates, which is especially useful in high volume and efficient dewatering of fine particle sized mineral slurries.

A further object of the invention is to provide apparatus for filtering an aqueous mineral slurry by flowing same through a microporous filter plate, which enables clean and effective discharge of the filter cake.

It is yet a further object of the invention, to provide an apparatus of the foregoing character, which facilitates rapid and effective cycling of the filter plates through the filter cake forming, cake drying, cake removal, and filter cleaning steps which are involved in cyclic use of such plates.

SUMMARY OF INVENTION

In our copending application filed simultaneously herewith, we disclose a method for filtering an aqueous mineral slurry by flowing the slurry through a filter plate of the type characterized by a porous support layer and an overlying porous metal filtration layer, with flow through the filter plate during filtration being from the filtration layer side toward the base layer and being effected by establishing a fluid pressure differential across the filter plate. The filtration layer preferably comprises a sintered metal and has a relatively narrow pore size distribution, i.e. one wherein substantially all of the pores are 5 µm or less, being generally in the range of from 0.1 to 5 µm, and preferably in the range of 0.2 to 3 µm. Discharge of the filter cake which accumulates upon the plate during filtration, is facilitated by subjecting the support layer side of the plate to one or more positive water pressure pulses, to effect a transient reverse water flow through the plate, thereby generating via the uniform pore structure of the filtration layer a uniform back pressure and a lubricating film of water at the interface between the filtration layer and the filter cake. Controlled oscillations or vibrations are simultaneously or shortly thereupon imparted to the surface of the porous filtration layer to facilitate separation of the filter cake.

Typically the said water pulse(s) will have a pressure in the range of from about 15 to 45 psi and a duration of up to 15 seconds, but preferably from about 2 to 5 seconds. The oscillations or vibrations may be effected from suitably coupled springs or by transducers or the like. The vibrations or oscillations are applied immediately following the water pulse(s) or can be applied simultaneously or at least in part simultaneously. The filter surface during application of the oscillations or vibrations is preferably oriented at an angle of between 0° and 45° with respect to the vertical, and the oscillations are coupled to the plate as to impart vertical oscillations to the latter so that the filter cake as it is dislodged may readily slide from the filter surface to a collecting point or vessel. Following the aforementioned steps, the filter plate may be cleaned by inducing a backwash of water from the support layer side of the plate, while simultaneously applying ultrasonic vibrations to the plate.

Pursuant to the present invention, apparatus is provided which is applicable to practice of the above method, although not being limited thereby.

The apparatus includes a filter plate having an interior porous support layer and a microporous metal filtration layer overlying said support layer, the pore sizes in said filtration layer being generally in the range of 0.1 to 5 µm and preferably in the range of from about 0.2 to 3 µm; and the side of the filtration layer non-adjacent said support layer constituting a filtration surface for said mineral. The support layer preferably comprises metal, preferably being a relatively open wire mesh. Fluid flow means are connected to the filter plate for flowing fluids from and to the interior porous support layer. Means connected to the fluid flow means enable selective drawing of a partial vacuum at the support layer to effect fluid flow inwardly through the filtration layer and porous support layer, and enable constant or pulses of positive fluid pressure at the support layer to cause an outward fluid flow through the support layer and filtration layer. A mineral cake-forming station is provided, which includes a container for receiving the mineral slurry, and means for positioning the filter plate within the slurry while drawing the partial vacuum, to cause the mineral to deposit on the external surface of the filtration layer as the aqueous phase of the slurry is withdrawn through the filtration and support layers. A cake-drying station downstream of the cake-forming station permits additional moisture to be removed from the cake by continued application of the partial vacuum with the plate removed from the container. A cake-discharge station is provided downstream of the cake-drying station, whereat application of the positive pressure pulses at the interior support layer of the plate causes a water film to form between the cake and said filter surface, thereby loosening the cake, causing the cake to be dislodged to facilitate removal from said filter plate. A plate-cleaning station is provided downstream of the cake-discharge station, whereat positive back pressure of water at the interior of the plate effects cleaning of said plate. Control means connected to the fluid flow means enable the drawing of a partial vacuum at the cake-forming and cake-drying stations, and enable the positive water pressure pulses at the cake discharge station, and enable the constant backwash pressure of water at the plate-cleaning station.

The cake-discharge station may further be provided with oscillation or vibration means for imparting oscillations or vibrations to the plate to facilitate the dislodging and release of the said filter cake.

While the invention is particularly applicable to the dewatering of aqueous mineral slurries, it is more generally applicable to the separation or filtering of fine particles (less than 325 mesh, or having an equivalent spherical diameter of less than 44 µm) from a liquid carrier or media for such particles.

DESCRIPTION OF PREFERRED EMBODIMENTS

Figure 1:
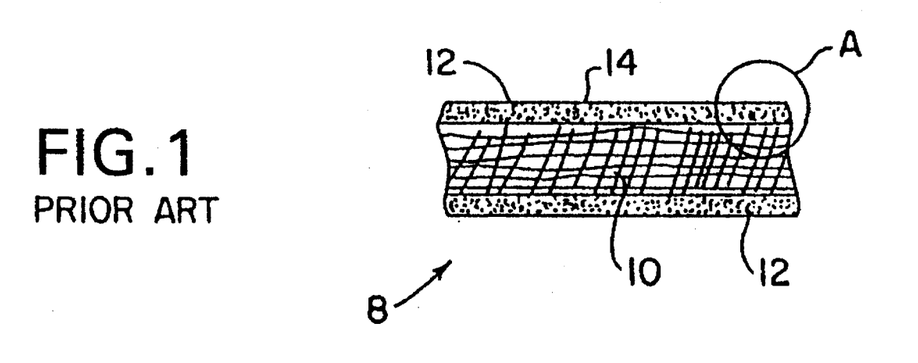
FIG. 1 is a diagrammatic cross section through a portion of a prior art filter plate of the type utilizable in the present invention.

The filter plates utilized in the present invention are per se known in the prior art. To assist in an understanding of the present invention, there is shown in FIG. 1 a schematic depiction of a prior art filter of the type aforementioned, and which may be utilized in the invention. A small cross-section of the filter plate 8 is shown, which is seen to consist of an inner porous support layer 10 which is composed of wire mesh, e.g. of a nickel stainless steel. Mesh size can range down to 2 mesh with 8 mesh being typical. Wire diameter can be up to ¼" or more, with 0.035 inches being typical. Wire size and mesh are not critical so long as flow from the filter layers are not impeded. Layer 10 thus supports on each side of same a relatively thin microporous filtration layer 12 which comprises a sintered metal such as a nickel stainless steel. The pore size in the filtration layer is typically very narrowly defined, i.e. in the present invention such pore size is generally in the range of 0.1 to 5 μm and preferably in the narrow range of from about 0.2 to 3 μm; i.e. there is a high uniformity of pore size in the said filtration layer 12. It will be clear that different size plates and structures of different dimensions and thicknesses are readily prepared. Very typically a plate of the type shown in FIG. 1 can have a overall thickness of about 0.25 inch, with the thickness of the filtration layer 12 being very typically 0.025 to 0.10 inch. The interior of the plate, i.e. which is defined by the inner support layer 10, may in use be connected to a source of negative pressure or suction via a conduit connecting to the interior of the plate. Such a detail is shown in U.S. Pat. No. 4,863,656 for a ceramic plate. In use in filtering a slurry of particulate material, such a plate after immersion in the slurry is provided with a negative pressure at the interior, i.e. a gentle suction, which draws the slurry to the surface 14 of the filtration layer, where the particulate material will deposit as the liquid phase is drawn out through the interior via porous support layer 10. This phenomena is shown in greater detail in the enlarged view of FIG. 2, which shows the portion of FIG. 1 within the circle "A".

Pore sizes of even less than 0.1 μm can be used in the filtration layer 12 and can be advantageous in reducing blinding; however, the filtering flux rate through the filtration layer tends to become increasingly poor as the pore size is decreased below about 0.2 μm. At pore sizes over about 5 μm (assuming operation at 1 atmosphere pressure), an increasing amount of air is pulled through the filtration layer, with a resulting loss in efficiency.

Figure 2:
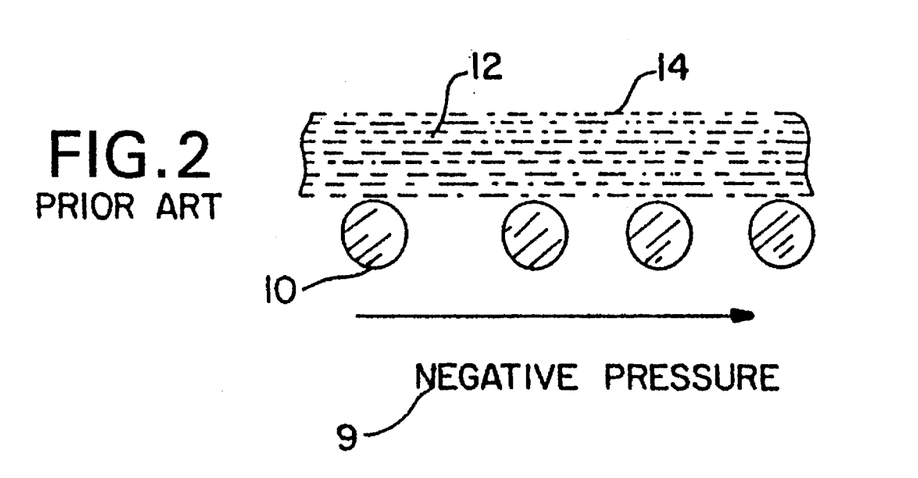
FIG. 2 is an enlarged view of the portion of the FIG. 1 depiction within the circle marked "A"
Figure 3A:
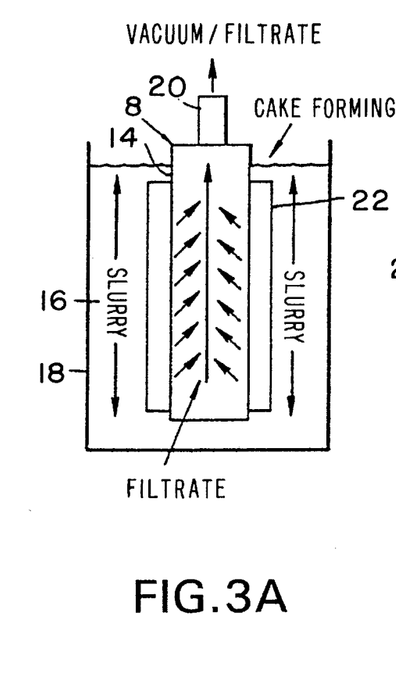
FIGS. 3a–3d are a schematic depiction of the steps which may be utilized in practice of the present invention.

The manner in which the method enabled by the present invention may be carried out is illustrated in FIG. 3 which schematically shows the sequence of steps involved in the present invention. In step (a) of FIG. 3, a filter plate 8 of the type discussed in connection with FIGS. 1 and 2 is shown as being immersed in a slurry 16 provided within a container 18. Slurry 16 can be a mineral slurry, as for example a kaolin slurry, with the kaolin being in either a dispersed or flocculated state, and typically having a solids content of from about 20 to 75%. The method is equally applicable to numerous other mineral slurries, however, as for example to those based upon dispersions of calcium carbonate pigments, including ground and/or precipitated calcium carbonate pigments. In these instances the carbonate slurries can in some cases be as high as 85 to 90% solids. Also as previously discussed, the method can be used to filter suspensions of other types of fine particles from a liquid carrier.

Figures 3B, 3C:
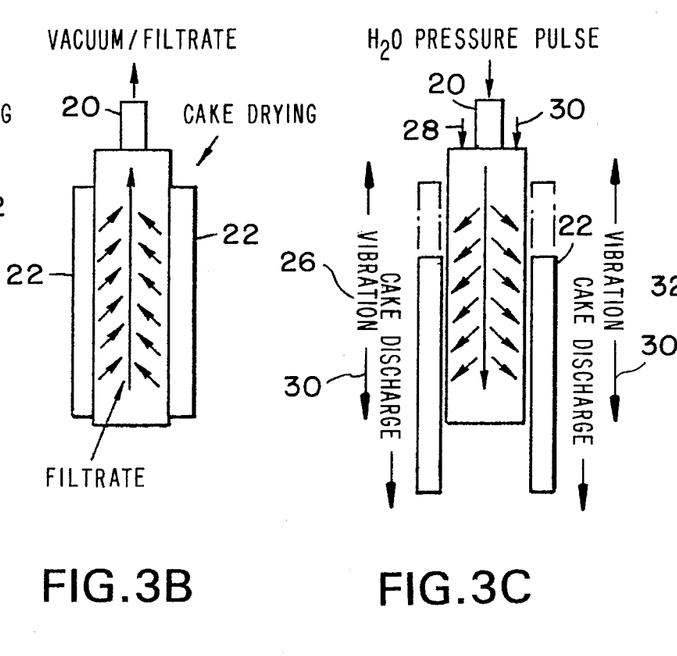

The step (a) in FIG. 3 is carried out by providing suction or a partial vacuum to the interior of plate 8, the central fluid pressure provided at the duct 20 being approximately 0.9 bars in a typical application. In consequence of such action a clear filtrate is drawn from the conduit 20 which is in communication with the porous support layer 10 at the interior of plate 8, and a filter cake 22 deposits upon the filtration surface 14. Very typically this cake, as for example where kaolin is filtered, can build up to thickness of about 1 to 25 mm. Once an appropriate buildup is achieved, the plate 8 is removed from the tank 18, and as is indicated at step (b) is subjected to further vacuum action to continue to draw further water from the cake 22 to effect an additional degree of drying. Typically the moisture remaining in the cake at the conclusion of step (b) is approximately 20 to 40% where kaolin is the material being operated upon. If desired, an additional step may be inserted between steps (a) and (b) for washing the filter cake. Thus the plate 8 carrying the filter cake can be immersed into a water bath while the vacuum is continued at conduit 20 or water can be applied by spraying or dribbling. Clean water drawn through the filter cake will remove undesired water-soluble salts and the like, after which step (b) is used to remove the excess water.

At step (c) the discharge of the cake 22 is effected. This action is brought about by extinguishing the suction to conduit 20 and providing one or more reverse pulses of water via conduit 20 and therefore to the interior support layer 10. The pressure pulses which are therefore positive with respect to atmosphere should have a preferable level of about 15 to 45 psi and a duration of approximately up to 15 seconds, but preferably for 2 to 5 seconds. Especially by virtue of the very uniform porous structure in filtration surface 12, it is found that the said pressure pulse(s) generate a thin water film 24 at the interface between the filter cakes 22 and the filtering surface 12. These films act essentially as lubricating films. Either wholly or partly simultaneously, or immediately following application of the pressure pulse(s), vertical oscillations or vibrations 26 are applied to the plate 8 and specifically to the filter surface 12 by means of mechanical couplings such as springs or by pneumatically or electromagnetically actuated vibrator heads or the like. Such vibration can for example be brought about by one or more transducers applying vibrational forces such as at 28 and/or 30; or oscillations can be induced in coiled springs from which plate 8 is suspended, as will be further discussed herein. Preferably during the pressure pulsing and imparting of oscillations or vibrations, the plate 8, as is suggested in the illustration of step (c), is oriented in a vertical or substantially vertical position, i.e. so that the plane of the filter cakes is substantially vertically oriented. The oscillations or vibrations are applied as to impart oscillatory movements of the plate in a vertical direction; as is suggested by the arrows 30. In a presently preferred arrangement, the plate 10 is suspended from a frame through spring coils. These coils are compressed and then suddenly released when it is desired to impart the oscillatory forces to the plate; i.e. the resultant oscillation of the released springs are directly coupled to the plate which is suspended from the springs. This type of arrangement will be illustrated in connection with FIG. 8.

In consequence of the water pressure pulse(s) and the said oscillatory or vibratory forces, the cake 22 having been dislodged and provided with a lubricating film at its interface with the filter surface 12, is found to not only be dislodged, but to fall virtually as a unit from the surface of the filter to an underlying receiving surface or receptacle, which can for example be a collection bin and/or a conveyor belt or the like, which removes the cake to a point for further processing, or a tank where the cake is repulped into a slurry.

It should be emphasized that the discharge of the cake in this manner is totally at variance with expectations, since one finds in the prior art that scraper blades or the like are required. Indeed it has heretofore been considered that one can remove the cake only with the greatest difficulty, and in fact the cake where so removed is scraped off in somewhat in the manner of a snowplow, i.e. the material is only removed where the scraper comes in contact with same. Unlike the results yielded by the present invention, unitary and complete dislodgement of the filter cake has not heretofore been possible by use of the prior art methods. The sintered metal filtration layers of this invention are superior in this respect to the ceramic plates used in our U.S. Pat. No. 5,098,538, in that the metal layer can be provided with an exceedingly smooth, polished surface which further facilitates cake discharge.

Figure 3D:
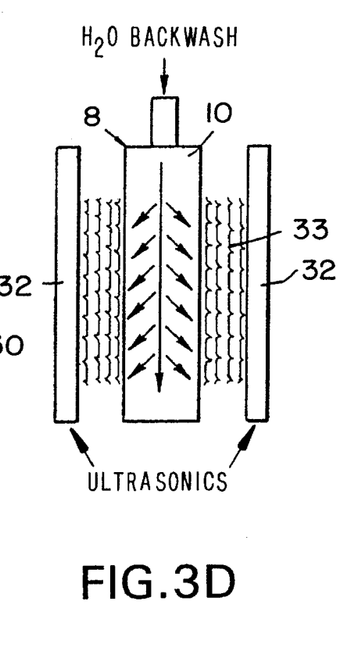

The removal by step (c) of the filter cake is so complete, that cleaning requirements are relatively minimal. However, in order to assure the utmost efficiency in the operation of the present devices, the filter plate is preferably subsequently subjected to a cleaning operation as shown at step (d), wherein a backwash of water is provided at conduit 30 via a steady flow of water into the interior support layer 10 of plate 8. It is preferable to simultaneously provide ultrasonic energy 33 incident upon the plate via one or more transducers 32, which assist in dislodging any tenaciously held material at the pores of the filtration surface. This action may be carried out for a period of about 10 minutes, using a back pressure of approximately 15 psi. More generally the backflush (and optional ultrasonic vibrations) can be applied to the plate for a period up to about 2 hours—further application yielding little additional benefit. Typical transducers utilizable for these purposes are available from Branson Ultrasonic Corporation. During the operation shown in step (d), the plate 10 can be suspended in a tank of water, whereby transducers 32 can be positioned at such points in the tank as to couple their sonic energy to the plate via the water medium with which the transducers are in contact.

Figure 4:
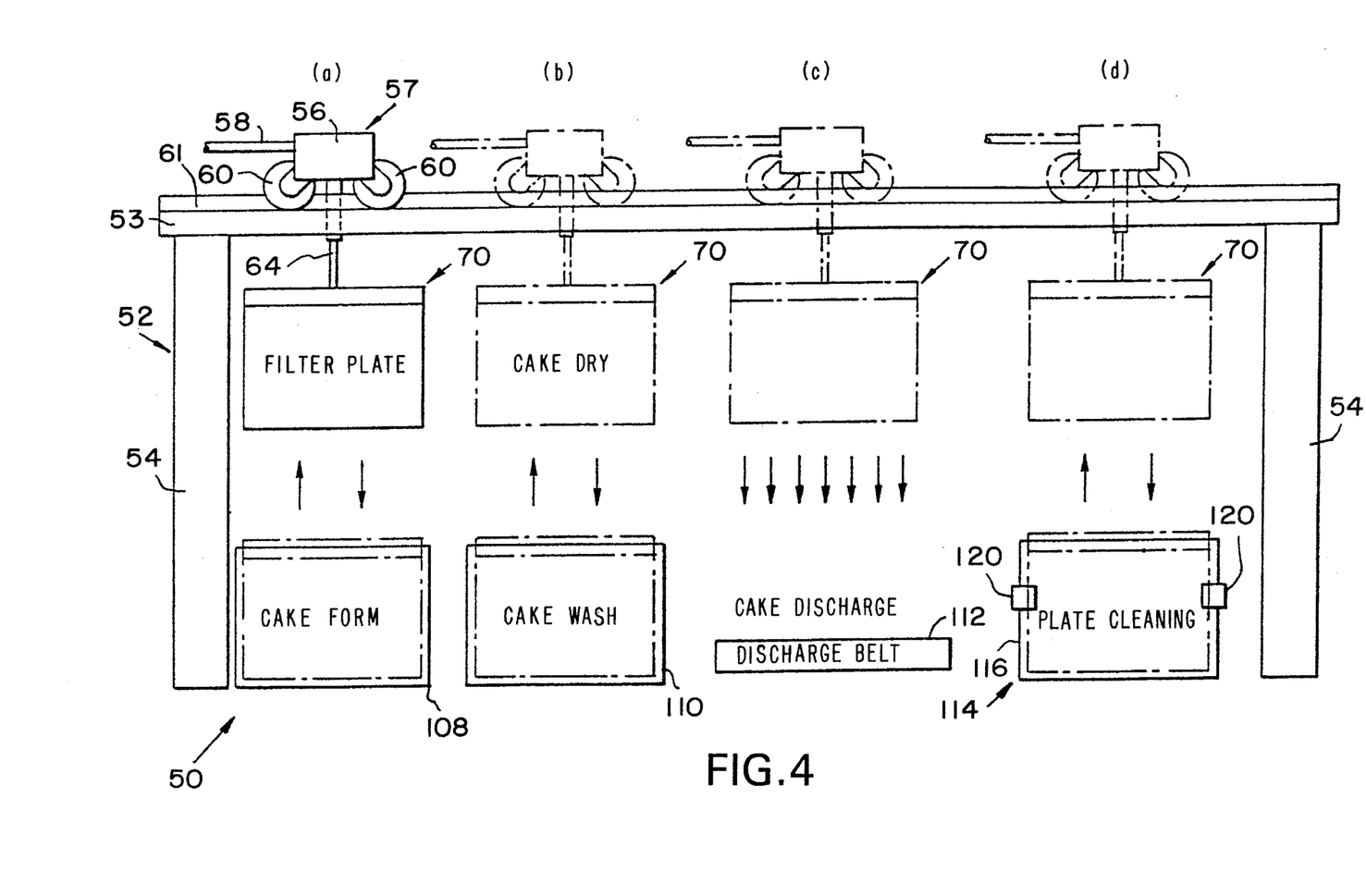
FIG. 4 is a side elevational schematic view of apparatus for filtering an aqueous mineral slurry in accordance with the present invention.
Figure 5:
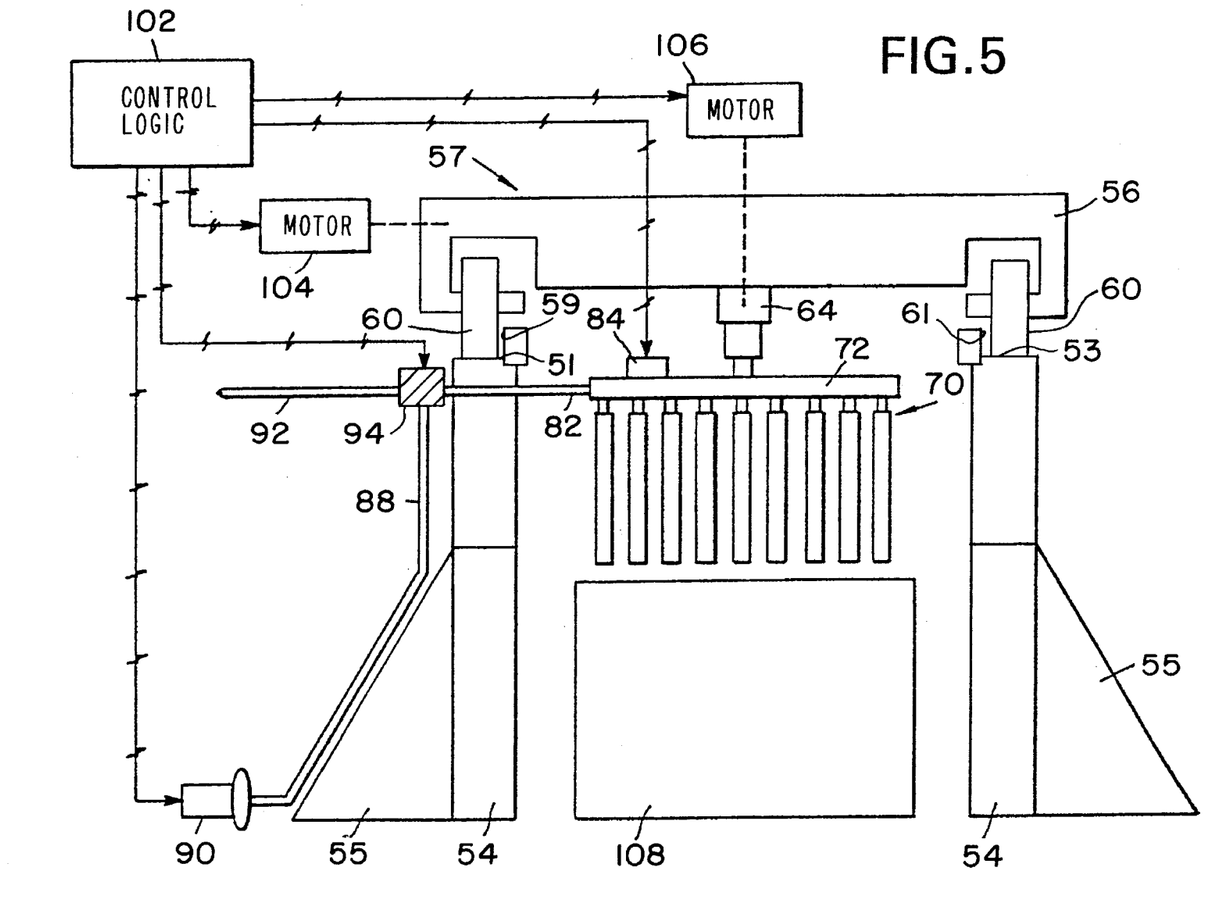
FIG. 5 is a front elevational view of the apparatus of FIG. 4.

In FIGS. 4 and 5 herein, side elevational and front elevational views respectively appear, each being schematic in nature, of apparatus 50 in accordance with the present invention. The apparatus 50 may be considered to represent a device which can effect the method steps depicted in FIG. 3 in a rapid and commercially acceptable fashion, so as to produce a high volume of filtered output mineral in a dependable and efficient fashion.

As best seen in FIGS. 4 and 5, the apparatus 50 generally comprises a support frame 52 consisting of a plurality of uprights 54 buttressed by cross supports 55 and a pair of guide rails 51 and 53 which extend longitudinally at alternate lateral sides of frame 50 the entire length of same. A support carriage 57 including a beam 56 is provided with tracking wheels 60 which are mounted at the opposed ends of beam 56 through suitable bearings (not shown). One set of two such wheels are mounted at each of the opposed sides of the support beam. These wheels 60 ride upon the rails 51 and 53, with the inside guide walls 59, 61 maintaining the proper positioning of carriage 57 as it is moved from left to right in the sense of FIG. 4 by means of a hydraulically actuated ram 58 which is extensible and withdrawable in the direction 61. Carriage 57 carries a vertical displacing means 64 at the center of beam 56 from which depends the filter plate subassembly generally indicated at 70. Means 64 can comprise a telescopable piston rod which is again actuated hydraulically.

Figure 6:
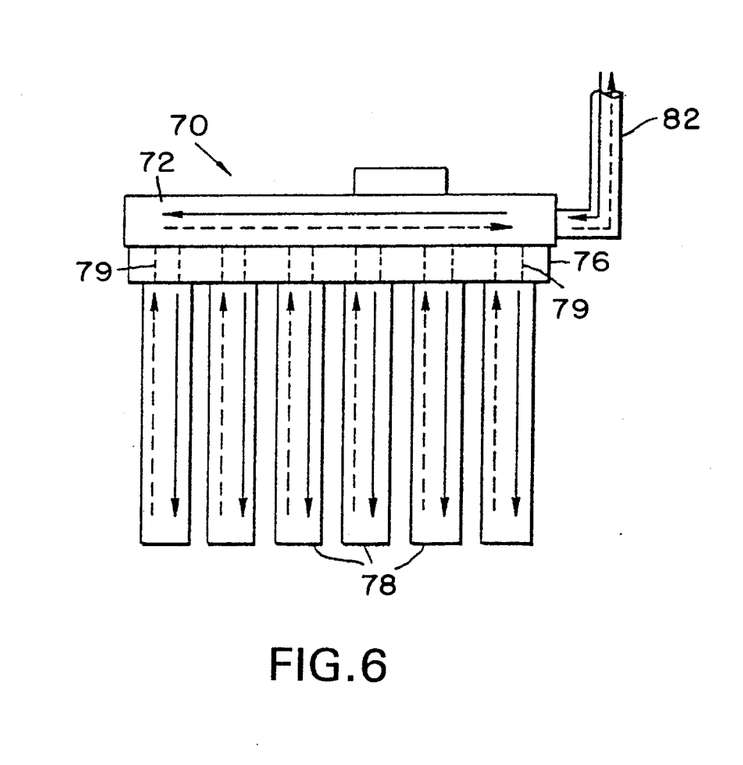
FIG. 6 is a front elevational view, schematic in nature, of the plate mounting subassembly portion of the apparatus of FIGS. 4 and 5.
Figure 7:
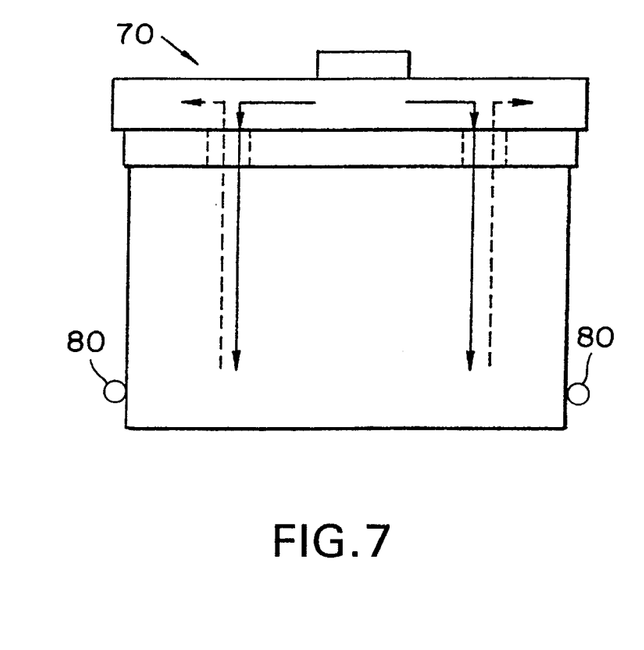
FIG. 7 is a side elevational view of the subassembly of FIG. 6.

Details of subassembly 70 may be better seen in FIGS. 6 and 7. Subassembly 70 includes a manifold distributor 72 beneath which is mounted a rigid mounting frame 76, to which in turn are secured a plurality of filter plates 78, of which representatively six are shown in FIG. 6. In practice a larger number of such plates may be used as desired, and suitable dimensions are employed so that the area of filter surface available is in accordance with the requirements of a particular installation. Each of the filter plates 78 may be considered to be in accordance with the depiction of FIG. 3. The subassembly 70 also includes stabilizing bars 80 which maintain the plates 78 in a relatively rigid relationship to the overall subassembly.

As also seen in FIG. 7, a vacuum and backflush line 82 is connected to manifold distributor 72. Plates 78 may be effectively suspended from frame 76 through compressible and releasable springs as previously described (see FIG. 8), or one or more vibrators 84 (FIG. 5) which are capable of providing vibrations in a substantially vertical plane (in the sense of the Figure) are affixed to subassembly 70. Vertical oscillations or vibrations may thereby be effectively transmitted to the individual filter plates 78. As may be seen in FIG. 5, a vacuum line 88 connected to a vacuum pump 90, in turn is connected via valve 94 to manifold distributor 72, so that suitable drawing of a partial vacuum may be effected within the support layer 10 of the individual filter plates 78 via ports 79 which extend between distributor 72 and the interiors of the filter plates. Similarly, a backflush water line 92 is connected via the solenoid or other actuated valve 94 which is also connected to vacuum and backflush line 82. It will be evident that by suitable actuation of the 3-way solenoid valve 94, either, the vacuum line 88 or the backflush line 92 may be connected to manifold 72. Control logic 102 is connected to the vacuum pump 90 and to valve 94, so that positive or negative fluid pressure may be appropriately directed to the manifold 72, to in turn provide pressure levels as desired within the interior support layer 10 of filter plate 78. Control logic 102 is also connected to actuating motors 104 and 106 which respectively activate the longitudinal movement of the support carriage 57 from station to station, and the hoisting and lowering of the subassembly 70 in a vertical direction. These motors may effect hydraulically displacement of ram 58 and vertical displacing means 64.

The basic operation of the apparatus 50 of FIGS. 3, 4 and 5 may be best appreciated from FIG. 4. Under operation of control logic 102, the support carriage 57 having been moved to the position (a) shown at the left of FIG. 4, actuates motor 106 to cause filter plate subassembly 70 to be lowered into a slurry tank 108 at which a mineral slurry of the type aforementioned is present. Hence, at this point, the entire subassembly 70 is contained within the volume of such slurry. Under operation of control logic 102 which activates valve 94, a partial vacuum is now enabled to the interior support layer 10 of the plates 78 via pump 90, vacuum input line 88 and the manifold 72. The partial vacuum is maintained for a sufficient period to build up a desired level of caked mineral as aforementioned. At this point, the vacuum is continued as the filter plate subassembly 70 is hoisted vertically so as to be clear of tank 108. Carriage 57 is now moved, again under control logic 102 to the position (b) shown in FIG. 4, at which cake drying occurs by virtue of continued operation of the vacuum line. (Alternatively carriage 57 may be left at position (a) as the partial vacuum is maintained, whereby the drying station is defined at a point overlying tank 108.) If desired, the cake may also be lowered through the aforementioned hoisting and lowering mechanism into a further washing tank 110 from which water can be drawn through the cake to remove any remaining impurities or materials which would detrimentally affect the product. For example, in certain types of kaolin operations as previously, discussed, salts may remain in the cake which are desirable to remove. Such removal can be effected as indicated by the additional washing step.

If a washing step is effected then additional drying is carried out with the subassembly 70 being in its position removed from the tank 110, as shown at (b) in FIG. 4. At this point the subassembly 70 is moved to position (c) by the same procedure just indicated. Under control logic 102 the partial vacuum is now cut off and the pressure in line 92, i.e. a backflush water line, is utilized to apply intermittent water pulses to the interior support layer 10 of the plates as described in connection with FIG. 3. This can be effected by opening the valve 94 intermittently to enable the pulses to proceed. The typical pulse durations utilizable herein are for a period of up to 15 seconds, with 2 to 5 seconds being preferable, with the pressure from the line being at approximately 10 to 20 psi with 15 psi being typical. Simultaneously with such pulsing or shortly thereafter, a signal is provided via line 110 to vibrator 84, which actuates the latter to provide the required vertical vibration (or oscillations as will be discussed in connection with FIG. 8). Under the influences previously discussed in connection with FIG. 3, each of the filters 78 release its cakes, in most instances as complete unified sheets, and as shown in FIG. 4, these materials drop under the influence of gravity to a receiving point which can constitute a discharge conveyor belt 112 which moves perpendicular to the plane of the FIG. 4 shown. The conveyed away discharge material may then be recovered at a convenient location for further processing and use.

After discharge the subassembly 70 is finally moved to a plate cleaning station 114. At this locale, the subassembly 70 may be lowered into a cleaning tank 116. Backflushing of the plates occurs here by introducing the full pressure of line 92 into continuous fashion into the manifold 72 via the valve 94 which is open to 92 continuously for such purposes. Simultaneously with this backflushing operation, ultrasonic vibration may be provided to the subassembly by means of transducers 120 which may be installed at two or more walls of tank 116 in contact with water within the tank. Transducers 120 are actuated in response to a signal from control logic 102. The apparatus 50 is provided with various sensors such as contact switches and the like, so that upon the subassembly and support carriage reaching suitable positioning points the locations are sensed and accurately maintained until completion of the desired operation at such location.

Figure 8:
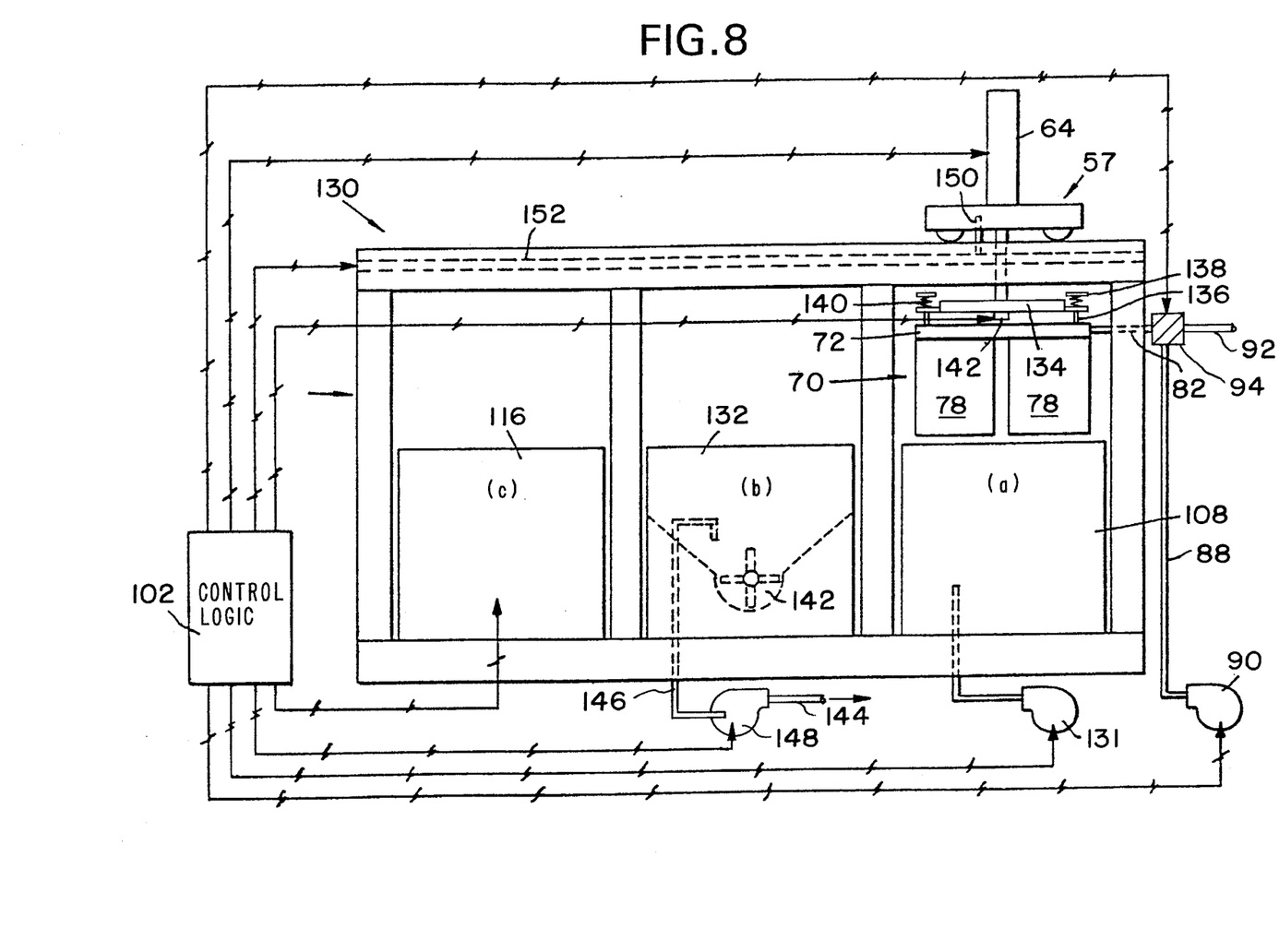
FIG. 8 is a side elevational schematic view of apparatus which is functionally similar to that of FIG. 4, but including several further features.

In FIG. 8 an apparatus 130 appears, having the same basic functional attributes of the apparatus 50 depicted in FIGS. 4 through 7 appears. However, certain modifications are present in the apparatus 130 which is shown in this Figure. In general, portions of apparatus 130 which correspond to those of the prior described embodiment are similarly identified for purposes of simplification. The view may be best compared with the showing of FIG. 4, except it will be seen that in the depiction of FIG. 8 support carriage 57 moves (in the sense of the Figure) from right to left. In apparatus 130 the functions of cake forming and cake drying are both carried out at the longitudinal position identified as (a) at the right of the Figure. Specifically, by means of vertical displacing means 64 as previously described, the subassembly 70 is lowered into the tank 108 which is fed mineral slurry by feed pump 131. The filter cake is formed, after which the means 64, having been actuated by control logic 102, withdraws subassembly 70 from tank 108 to the position actually shown in FIG. 8. Again, continued operation of the partial vacuum via line 82 continues to withdraw excess moisture from the cakes as previously described. Subassembly 70 includes a plurality of filter plates 78. These are shown as being arranged as side by side pairs (in successive planes) as opposed to the single larger plates which are schematically shown in FIG. 4.

It will be particularly noted that a specific arrangement is now provided which during the cake discharge function enables a vertical oscillatory motion to be induced at subassembly 70 to assist cake discharge. This function is effected after the support carriage 57 is displaced to the position (b), i.e. wherein the plates overlie cake discharge tank 132. More specifically it is seen that subassembly 70 is suspended from a cross-support piece 134 by a plurality of support pins 136 which are vertically slidable in openings provided at the lateral edges of piece 134. Each of the support pins, the bottom of which are affixed to subassembly 70, have enlarged heads 138. Coil springs 140 are mounted about the pins beneath heads 138. A vertically displaceable pusher rod 142 is mounted on cross-piece 134 and is actuatable (e.g. by a solenoid) by control logic 102. When it is desired to induce the aforementioned oscillatory motion, the rod 142 is actuated to displace the subassembly 70 in a downward direction causing compression of the springs 140. Upon sudden withdrawal of rod 142, it will be clear that the said springs (then under compression) immediately expand and oscillatory up and down motion ensues which is found to be unusually effective in assisting the discharge of the filter cake as aforementioned. Precedent or during this operation, as previously described, one or more pulses of water are provided through the filtration surface at the underside of the cake, i.e. the water pulse(s) and inducing of oscillatory motion may be applied simultaneously or in succession.

Apparatus 130 is also seen to differ somewhat in mode of operation in that at the cake discharge station, i.e. at position (b) at the center of the Figure, it will be seen that the cakes fall from subassembly 70 into the tank 132 rather than onto a discharge belt 112 as discussed in FIG. 4. A repulper 142 is provided at the bottom of the tank 132, i.e. essentially an agitator. The discharging cake together with the small quantities of water from the water pulse(s) are slurried by rotation of the repulper and a discharge product is then taken at 144 via line 146 and the pump 148. Pump 148 again is under operation of control logic 102 so as to be actuated at appropriate times. After discharge is completed, the support carriage 57 is displaced longitudinally to its final position at the left side of the Figure as identified at (c), where a plate cleaning tank 116 is provided. Preferably as described in connection with FIG. 4, ultrasonic pulses may also be utilized during this cleaning operation by means of suitable transducers as previously described. The support carriage 57 is moved longitudinally between its successive positions (a), (b) and (c) by means of hydraulically or pneumatically actuated motor elements—an arrangement as described in FIG. 4 may be utilized, or as shown, a vertically-oriented connecting rod 150 may engage with a slidable element or piston which is pneumatically or hydraulically displaceable in a cylindrical passage 152 extending the length of the frame. Equivalent means for displacing rod 150 to enable movement of carriage 157 to desired positions may be utilized, as for example a rotary threaded shaft upon which is mounted a carrier piece which is internally threaded and engages the shaft and rod 150.

The present apparatus has been described especially in terms of rectangular geometries. It will be appreciated by those skilled in the art that arrangements based upon other geometries are similarly achievable. For example, instead of having successive stations arranged in rectangular coordinates, a carousel type arrangement may be utilized in which successive forming, discharge and cleaning stations as shown in FIG. 8 may be constituted as sectors of a cylinder. Thus each of the tanks 108, 132 and 116 in FIG. 8 can constitute successive 120° arcs of a cylindrical arrangement. In this instance, a crane extending from a central support column engages the subassembly 70 and by swiveling successively moves same from one sector of the cylindrical arrangement to the following one. One advantage of such an arrangement is that it enables unidirectional movement of the subassembly by virtue of continuous rotation of the center pivotal support for the subassembly. It will also be evident that multiple subassemblies can be processed at one time in such arrangement with semicontinuous movement occurring, a result which is not as readily achievable in the rectangular geometry arrangements previously discussed.

While the present invention has been particularly set forth in terms of specific embodiments thereof, it will be understood in view of the present disclosure, that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. Apparatus for filtering an aqueous mineral slurry comprising in combination:

(a) a filter plate having an interior porous support layer and an external microporous metal filtration layer overlying said support layer, the pore sizes in said filtration layer being substantially entirely 5 µm or less; and the side of said filtration layer non-adjacent said support layer constituting a filter surface for said mineral;

(b) fluid flow means connected to said plate for flowing fluids from and to said porous support layer;

(c) means connected to said fluid flow means, for selectively drawing a partial vacuum at said support layer to effect fluid flow inwardly through said filtration layer and porous support layer, and for providing one or more pulses of positive liquid pressure at said support layer to cause an outward liquid flow through said support layer and filtration layer;

(d) a mineral cake-forming station, including a container for receiving said mineral slurry, and means for positioning said filter plate within said slurry while drawing said partial vacuum, to cause said mineral to deposit on the external filtration layer as the aqueous phase of said slurry is withdrawn through said filtration layer and said support layer thereby forming a cake on said filtration layer;

(e) a cake-drying station for permitting additional moisture to be removed from said cake by continued application of said partial vacuum, said cake-drying station comprising means to remove the plate having the cake therein from said container;

(f) a cake-discharge station downstream of said cake-drying station, whereat application of said one or more positive liquid pressure pulses at the interior support layer of said plate causes a water film to form between said cake and said filter surface, said cake discharge station further comprising means for applying vibrations or oscillations to said plate, thereby loosening said cake, causing said cake to be dislodged to facilitate removal from said filter plate; and (g) control means connected to said fluid flow means for enabling said drawing of a partial vacuum at said cake-forming and cake-drying station, and for enabling said one or more positive liquid pressure pulses at said cake discharge station.

2. Apparatus in accordance with claim 1, wherein said filtration layer comprises a sintered metal having pore sizes in the range of 0.2 to 3 µm.

3. Apparatus in accordance with claim 2, wherein said support layer comprises a wire mesh.

4. Apparatus in accordance with claim 1, wherein said means (c) selectively provides constant or said pulses of said positive liquid pressure; and further including (h) a plate-cleaning station downstream of said cake-discharge station, whereat means for applying constant positive back pressure of water at the interior of said plate effects cleaning of said plate.

5. Apparatus in accordance with claim 1, including means for applying said vibrations or oscillations immediately following application of said positive liquid pressure pulses.

6. Apparatus in accordance with claim 3, wherein said cake discharge station includes means for positioning said plates during oscillation with the cake-carrying filter surface in a substantially vertical plane, and wherein said vibrations or oscillations are imparted in a substantially vertical direction; whereby to facilitate said cake dislodging.

7. Apparatus in accordance with claim 6, further including frame means for supporting elements (a) to (h), and means for transporting said plate successively to said cake-forming, cake-drying, cake-discharging and plate-cleaning stations.

8. Apparatus in accordance with claim 6, wherein a plurality of said plates are mounted in a plate support sub-frame, and wherein said apparatus includes means for moving said plate support sub-frame successively to said stations (d), (e), (f) and (h).

9. Apparatus for filtering a suspension of fine particles from a liquid carrier for same, comprising in combination:

(a) a filter plate having a fluid-flow pervious support layer and an overlying microporous metal filtration layer having an external filtration surface;

(b) fluid flow means connected to said plate for flowing fluids from and to said support layer;

(c) means connected to said fluid flow means, for selectively drawing a partial vacuum at said support layer to effect fluid flow inwardly through said filtration layer and support layer, and for providing constant level or one or more pulses of positive liquid pressure within said support layer to cause an outward fluid flow through said support layer and filtration layer;

(d) a particle cake-forming station, including a container for receiving said suspension and means for positioning said filter plate within said suspension while drawing said partial vacuum, to cause said particles to deposit on the external filtration surface of said plate;

(e) a cake-discharge station downstream of said cake-forming station, whereat application of said one or more positive liquid pressure pulses causes a liquid film to form between said cake and said filtration surface, thereby loosening said cake, said cake discharge station further comprising means for imparting oscillations to said plate, causing said cake to be dislodged to facilitate removal from said filter plate; and (f) control means connected to said fluid flow means for enabling said partial vacuum at said cake-forming and cake-drying station, and for enabling said positive liquid pressure pulses at said cake discharge station.

10. Apparatus in accordance with claim 9, wherein said cake discharge station includes means for positioning said plates during oscillation with the cake-carrying filter surface in a substantially vertical plane, and wherein said means imparting said oscillation effects the oscillations in a substantially vertical direction, to facilitate said dislodging function.

11. Apparatus in accordance with claim 9, further including a cake-washing station between said cake-forming and cake discharge stations, including a water reservoir for receiving therein said plates whereat continued application of said partial vacuum draws water through said cakes to remove water soluble impurities.

12. Apparatus in accordance with claim 11, further including frame means for supporting elements (a) to (f), and means for transporting said plate from said cake-forming to cake discharge station.

13. Apparatus in accordance with claim 11, wherein the pores of said filtration layer are substantially all less than 5 µm.

14. Apparatus in accordance with claim 12, wherein the pores of said filtration layer are substantially all in the range of 0.1 to 5 µm.

15. Apparatus in accordance with claim 12, wherein the pores of said filtration layer are substantially all in the range of 0.2 to 3 µm.

* * * * *